United States Patent [19]
Burgett et al.

[11] 3,753,107
[45] Aug. 14, 1973

[54] MAGNETIC GAUGE WITH TWO V-POSITIONED COILS AND HAVING MAGNETIC RESTORING RING

[75] Inventors: James F. Burgett, Garden City; Gerald A. Gorrell, Dearborn, both of Mich.; Norman D. Mills, Atlantic City, N.J.; Lawrence J. Vanderberg, Ann Arbor, Mich.

[73] Assignee: Ford Motor Company, Dearborn, Mich.

[22] Filed: June 21, 1972

[21] Appl. No.: 265,027

[52] U.S. Cl. .................................. 324/146, 324/154
[51] Int. Cl. ........................... G01r 1/20, G01r 1/00
[58] Field of Search ............................. 324/146, 154

[56] References Cited
UNITED STATES PATENTS
3,094,659   6/1963   Pfeffer .................................. 324/146
FOREIGN PATENTS OR APPLICATIONS
63,148   2/1945   Denmark ............................ 324/146

Primary Examiner—Alfred E. Smith
Attorney—Keith L. Zerschling and Robert W. Brown

[57] ABSTRACT

Magnetic gauge in which two electrical coils are positioned to form a V between them such that their axes intersect at a point intermediate and exterior of the coils. A permanent magnet is rotatable on a shaft which carries a pointer. The permanent magnet extends partially into each of the V-positioned coils and the vector resultant of the magnetic fields produced by currents in the coils determines the position of the rotatable magnet and the pointer carried by the shaft. A fixed resistor may be connected in series with one of the coils and a variable resistance may be connected in series with the other coil. A change in the variable resistance alters the current magnitude in its serially connected electrical coil.

2 Claims, 4 Drawing Figures

PATENTED AUG 14 1973

MAGNETIC GAUGE WITH TWO V-POSITIONED COILS AND HAVING MAGNETIC RESTORING RING

BACKGROUND OF THE INVENTION

This invention relates to a magnetic gauge and to an electrical circuit employing such gauge. The magnetic gauge of the invention is particularly suitable for use in motor vehicles and may be used to indicate fuel level, engine temperature, engine oil pressure, electrical current magnitude or direction, or other physical conditions.

The magnetic gauge of the present invention is of the type which utilizes two helically wound coils in conjunction with a rotatable permanent magnet preferably having a disc shape. The permanent magnet is attached to a shaft which is journalled in a support structure or housing about which the two coils are wound. The helically wound coils are positioned such that they form a V between them. Thus, the axes of these two coils intersect at a point that is located intermediate and exterior of the coils. Preferably, this point of intersection of the coil axes is located on the rotatable shaft that supports the permanent magnet. Also, it is preferred that the bobbins on which the coils are wound be formed integrally with the support structure for the permanent magnet and shaft. Preferably, the support structure is made from a pair of mating molded plastic parts.

DETAILED DESCRIPTION

Figure 4:
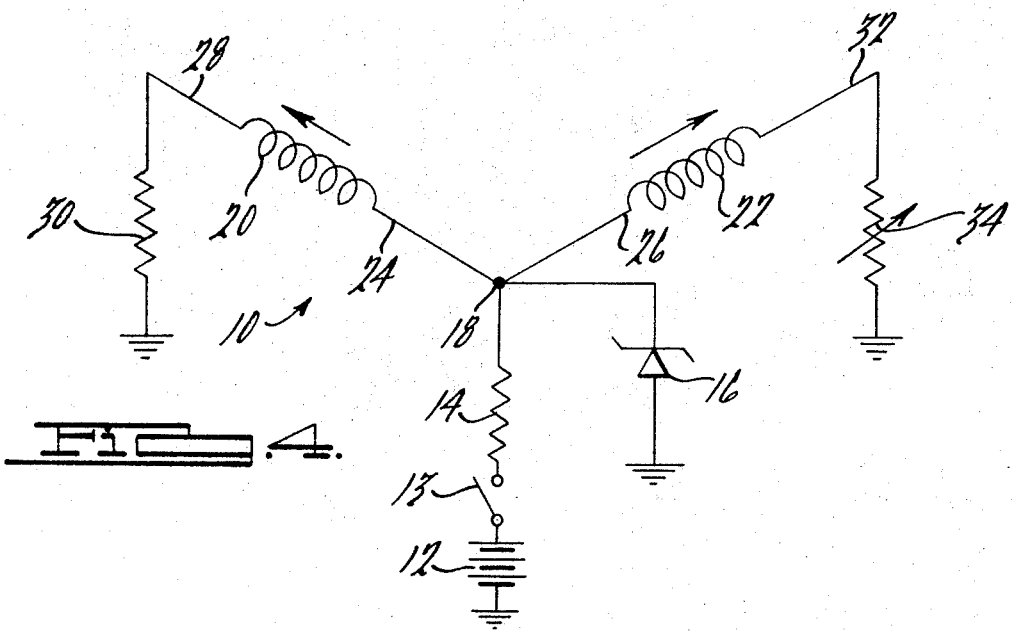
FIG. 4 is a schematic diagram of an electrical circuit in which the gauge of FIGS. 1 through 3 may be connected.

With reference to the drawings, wherein like numerals refer to like parts in the several views, and in particular to FIG. 4, there is shown a schematic diagram of an electrical circuit for a magnetic gauge. The circuit 10 includes a direct current source of electrical energy 12 that has one of its terminals connected to ground and its other terminal connected through a switch 13 to a current limiting resistor 14. A zener diode 16 may be connected in parallel with the source of electrical energy 12 and resistor 14. Thus, the zener diode 16 has one of its terminals connected to a junction 18 and has its other terminal connected to ground. The zener diode 16 controls the voltage applied to the magnetic gauge at the junction 18.

The magnetic gauge includes two electrical coils 20 and 22. A lead 24 connects one terminal of the coil 20 to the junction 18. Similarly, a lead 26 connects one terminal of the coil 22 to the junction 18. The other terminal of the coil 20 is connected by a lead 28 to a fixed resistance 30. The other terminal of the fixed resistance 30 is connected to ground as shown. Similarly, the other terminal of the coil 22 is connected by a lead 32 to a grounded variable resistance 34. The arrows adjacent the coils 20 and 22 indicate the directional orientations of the magnetic fields produced by currents in the coils. The variable resistance 34 may be changed in proportion to a change in a physical condition to be monitored. This varies the current and the magnetic field produced by the coil 22 to produce a corresponding change in the magnetic gauge indicating means.

Figure 1:
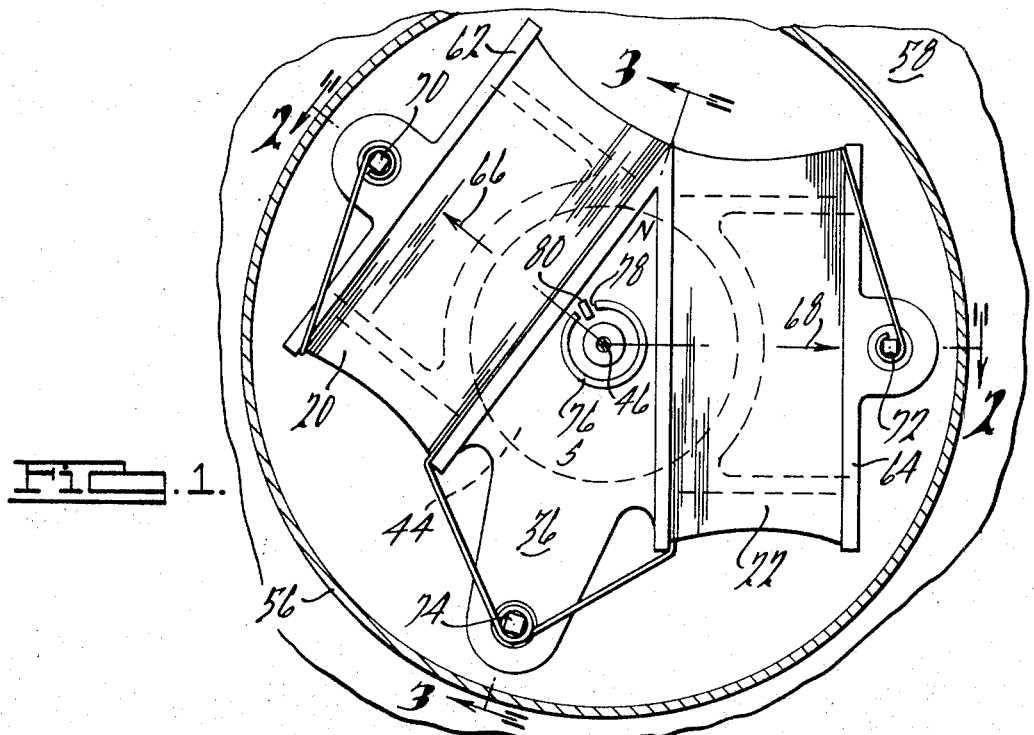
FIG. 1 is an enlarged view of a magnetic gauge constructed in accordance with the invention.
Figure 2:
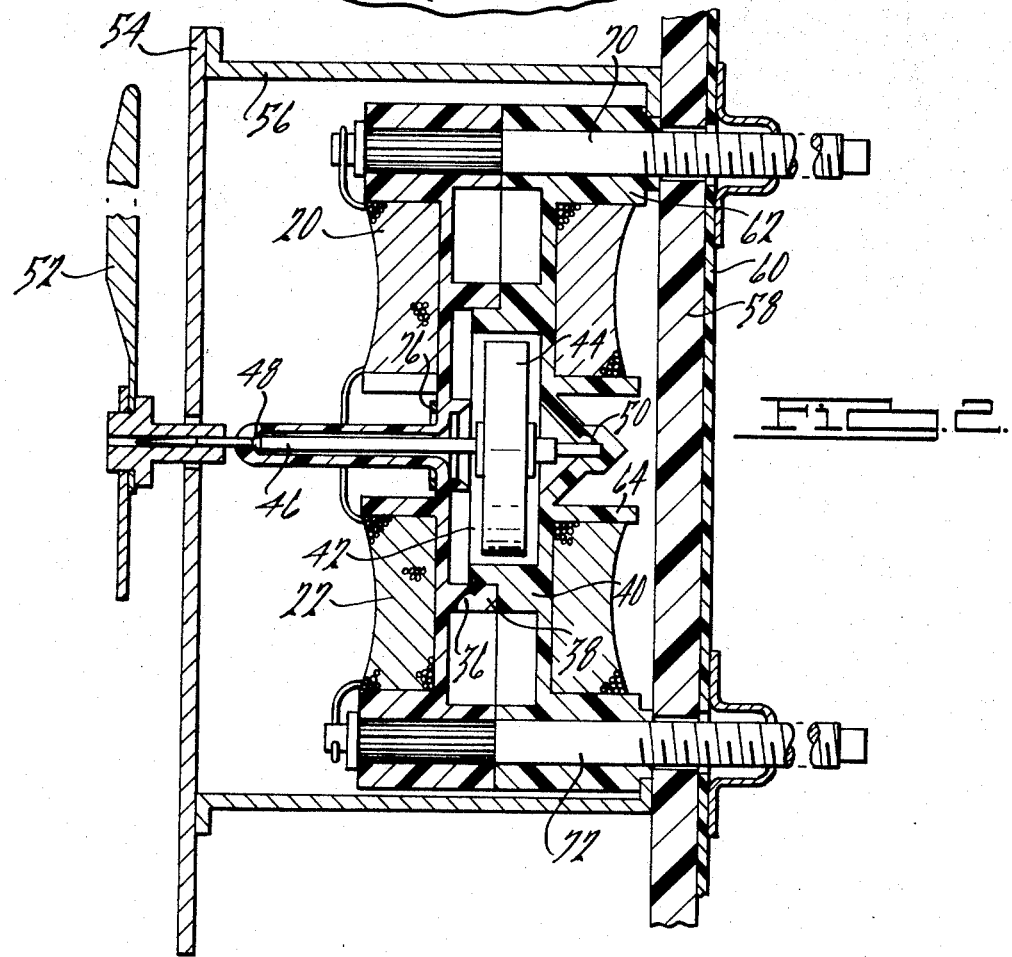
FIG. 2 is an enlarged sectional view of the magnetic gauge of FIG. 1, the section being taken along the line 2—2 in FIG. 1.
Figure 3:
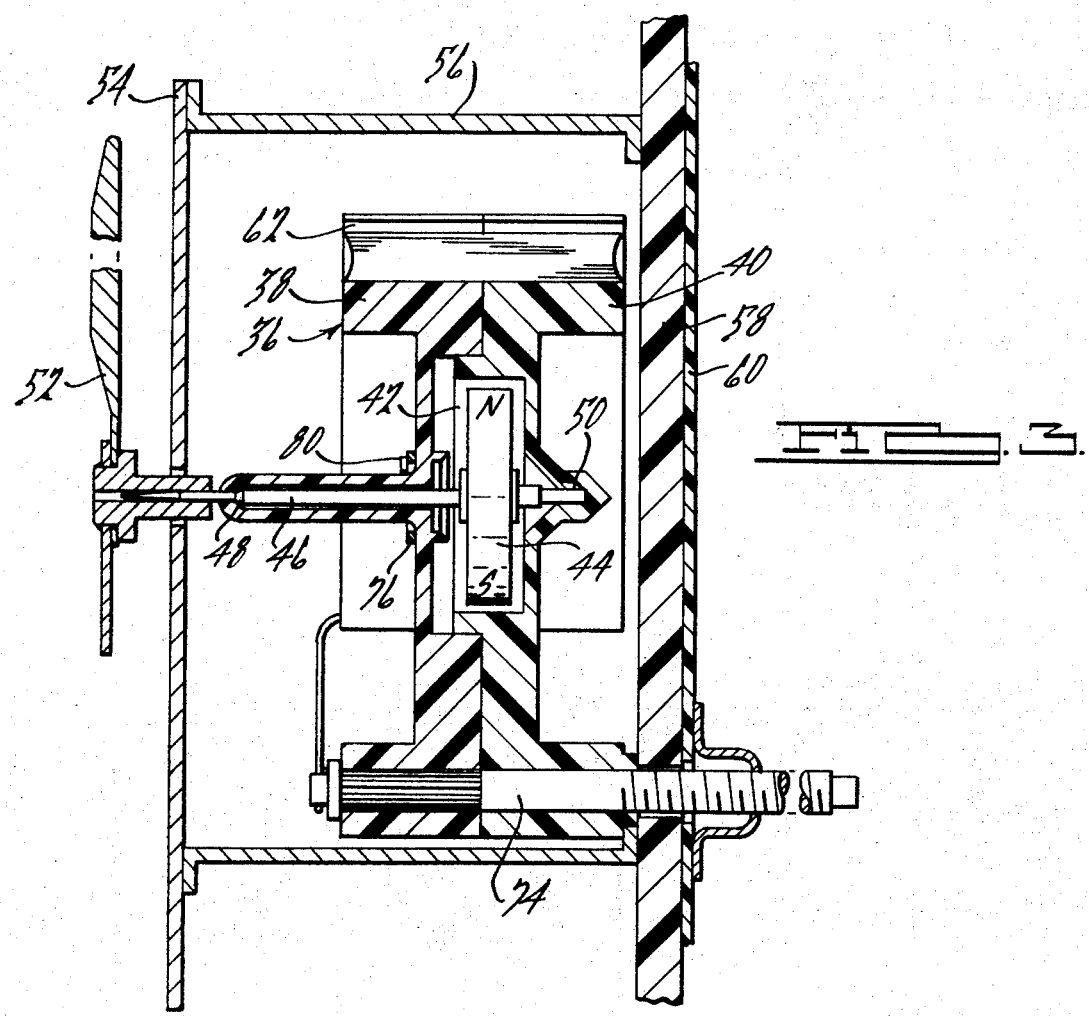
FIG. 3 is an enlarged sectional view of the magnetic gauge of FIGS. 1 and 2, the section being taken along the line 3—3 of FIG. 1.

With particular reference now to FIGS. 1 through 3, there is shown a magnetic gauge constructed in accordance with the invention. The magnetic gauge comprises a support structure 36 made from a nonmagnetic, and preferably molded plastic, material. The support structure 36 includes a first part 38 and a second mating part 40. The mating parts 38 and 40 of the support structure together define a chamber 42, preferably filled with silicone fluid, in which is positioned a disc-shaped permanent magnet 44 having a north pole N and a south pole S. The permanent magnet 44 is attached to a shaft 46 for rotation therewith. The shaft 46 is journalled in a bearing 48 in the first part 38 of the support structure and at its other end in a bearing 50 in the second part 40 of the support structure. A pointer 52 is also attached to the shaft 46 for rotation therewith. Rotation of the permanent magnet 44 causes the shaft 46 to rotate and, in turn, causes the pointer 52 to move across a scale plate 54. The scale plate 54 together with a casing 56 and a nonconductive back plate 58 enclose the magnetic gauge. A printed circuit material 60 may be bonded to the back plate 58 to facilitate electrical connection to the various terminals of the magnetic gauge.

As an alternative design, the magnetic gauge casing may be made from a magnetic material for the purpose of isolating the gauge coils and permanent magnet from stray magnetic fields.

The support structure 36 of the magnetic gauge includes two bobbins 62 and 64 on which are wound the electrical coils 20 and 22, respectively. Preferably, the bobbins 62 and 64 are of rectangular cross-section and are positioned such that a V is formed between them and the coils wound on them, as may best be seen in FIG. 1. Also, the axes of the coils 20 and 22 intersect at a point exterior of the coils and intermediate them. Specifically, the axis 66 of the coil 20 intersects the axis 68 of the coil 22 at a point located on or near the perpendicularly directed axis of the shaft 46.

The magnetic gauge support structure 36 is secured to the back plate 58 by conductive studs 70, 72, and 74, which preferably are made from a non-magnetic material. The leads from the coils 20 and 22 are connected to the studs 70, 72, and 74 as may best be seen in FIG. 1. The stud 74 is a common terminal for the coils 20 and 22 and corresponds to the junction 18 of FIG. 4. Conventional current flowing from the stud terminal 74 into the coils 20 and 22 produces magnetic fields having the directions indicated by the arrows on the axes 66 and 68. The rotatable permanent magnet 44 is shown in the position it would assume were the coils 20 and 22 to be of identical construction and the currents in them equal. In any case, the magnet 44 assumes a position wherein its poles are in alignment with the vector resultant of the magnetic fields produced by the coils 20 and 22.

If it is desired to cause the permanent magnet 44 to rotate to a particular position upon the cessation of current in the coils 20 and 22, for example, to provide a zero or low scale indication, a ring 76 made from a magnetic material may be positioned around the shaft 46. The ring 76 has a gap 78. The gap 78 is located in the appropriate position on the support structure 36 with the aid of an index tab 80 that is integral with the support structure. When current ceases to flow through the coils 20 and 22, as would occur were the switch 13 to be opened, the permanent magnet 44 rotates such that one of its poles is in alignment with the gap 78 in the ring 76. An important feature of the magnetic gauge of the invention is that the coils 20 and 22 do not overlap and thus may be made identical as to the number of turns of wire comprising them and may have identical cross-sections. Furthermore, the coils are symmetrically positioned and the rotatable permanent magnet 44 can be made to rotate from left to right or from right to left as desired. This is difficult to achieve in a gauge which has overlapping coils because one of the coils necessarily is exterior of the other and has reduced efficiency because of this. Moreover, the length of wire required to make a turn of the exterior coil is greater than that required for the interior coil. This affects the amount of electrical resistance of the turn. Because the coils are used in DC applications, the resistance of the coils determines the current levels through them and the gauge deflection.

The magnetic gauge construction of the invention allows the use of two identical gauge coils. This permits the same gauge mechanism to be employed in a variety of indicating applications in a motor vehicle.

Based upon the foregoing description of the invention, what is claimed and desired to be protected by Letters Patent is:

1. A magnetic gauge, which comprises: a support structure; a shaft journalled in said support structure; indicating means connected with said shaft; a permanent magnet attached to said shaft for rotation therewith; a pair of electrical coils helically wound on said support structure, said coils being positioned to form a V between them, the axis of said shaft being located between said coils within said V formed between said coils; and a ring made from a magnetic material, said ring having a gap in it, and said ring being positioned around said shaft or said magnetic gauge.

2. A magnetic gauge, which comprises: a support structure, said support structure including first and second mating parts, each of said mating parts having a bearing, said mating parts together defining a chamber; a shaft journalled for rotation in said bearings in said mating parts of said support structure, said shaft passing through said chamber formed by said mating parts of said support structure; a permanent magnet located within said chamber and attached to said shaft for rotation therewith; a first electrical coil helically wound on said support structure; a second electrical coil helically wound on said support structure, the axis of said first coil intersecting the axis of said second coil at a point exterior of and intermediate said first and second coils; and a ring made from a magnetic material, said ring having a gap in it, and said ring being positioned around said shaft of said magnetic gauge.

* * * * *